(12) United States Patent
Ferrigno et al.

(10) Patent No.: US 6,200,689 B1
(45) Date of Patent: Mar. 13, 2001

(54) LASER SHOCK PEENED GAS TURBINE ENGINE SEAL TEETH

(75) Inventors: Stephen J. Ferrigno, Cincinnati; Kevin G. McAllister, West Chester; Seetharamaiah Mannava, Cincinnati, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/170,969

(22) Filed: Oct. 14, 1998

(51) Int. Cl.$^7$ .............................. F01D 11/02; B23K 26/00
(52) U.S. Cl. .................... 428/600; 428/610; 219/121.64; 148/565; 148/900; 415/174.5
(58) Field of Search ...................... 428/600, 610; 219/121.64; 148/565, 900; 29/888.3; 415/174.5

(56) References Cited

U.S. PATENT DOCUMENTS

| | | |
|---|---|---|
| 3,850,698 | 11/1974 | Mallozzi et al. . |
| 4,159,410 | 6/1979 | Cooper . |
| 4,401,477 | 8/1983 | Clauer et al. . |
| 4,657,171 | 4/1987 | Robins . |
| 4,743,165 | 5/1988 | Ulrich . |
| 4,937,421 | 6/1990 | Ortiz, Jr. et al. . |
| 5,127,019 | 6/1992 | Epstein et al. . |
| 5,131,957 | 7/1992 | Epstein et al. . |
| 5,160,822 | 11/1992 | Aleshin . |
| 5,492,447 | 2/1996 | Mannava et al. . |
| 5,525,429 | 6/1996 | Mannava et al. . |
| 5,591,009 | 1/1997 | Mannava et al. . |
| 5,620,307 | 4/1997 | Mannava et al. . |
| 5,674,328 | 10/1997 | Mannava et al. . |
| 5,674,329 | 10/1997 | Mannava et al. . |
| 5,675,892 | 10/1997 | Mannava et al. . |
| 5,735,044 | 4/1998 | Ferrigno et al. . |
| 5,741,559 | 4/1998 | Dulaney . |
| 5,756,965 | 5/1998 | Mannava et al. . |

OTHER PUBLICATIONS

"Laser shocking extends fatigue life", by John A. Vaccari, American Machinist, July, 1992, pp. 62–64.
"Laser Shock Processing Increases the Fatigue Life of Metal Parts", Materials and Processing Report, Sep. 1991, pp. 3–5.
"Full Assurance Shot Peening Of Aircraft Gas Turbine Engine Components", by PG Bailey, DR Lombardo, HG Popp, RA Thompson, pp. 320–327. (No Month/Date).

Primary Examiner—Deborah Jones
Assistant Examiner—Jason Savage
(74) Attorney, Agent, or Firm—Andrew C. Hess; Gerry S. Gressel

(57) ABSTRACT

The present invention includes a method of repairing an annular metallic article and the repaired article itself which has an axially extending annular support and a projection generally radially extending therefrom. The projection has an associated operating radial height as measured from a radially facing annular first surface of the support and an associated shape. An upper portion of the projection is removed forming a stub extending away from the first surface and having a bonding surface at a stub end spaced apart from the first surface. A metallic material is metallurgically bonded to the bonding surface forming an annular heat affected zone in the stub bounded by the bonding surface. A first portion of the metallic material is removed to restore the projection to the operating height and shape. At least one annular outer surface of the tooth extending over at least a portion of the heat affected zone is laser shock peened, preferably after the first portion of the metallic material is removed. A tip of the stub formed by the removing of the first portion of the metallic material may also be laser shock peened as may a non-heat affected zone portion of the stub extending at least a partial length of a distance from the heat affected zone to the first surface. Opposite forward and aft facing annular surfaces of the projection may be laser shock peened, preferably simultaneously. The laser beam may be fired normal to or at an oblique angle to the forward and aft facing annular surfaces.

17 Claims, 7 Drawing Sheets

LASER SHOCK PEENED GAS TURBINE ENGINE SEAL TEETH

BACKGROUND OF THE INVENTION

1. Field of the Invention

This invention relates to gas turbine engine rotor seals with teeth such as labyrinth seal teeth and, more particularly, to such teeth having localized compressive residual stresses imparted by laser shock peening and repaired seals with teeth rebuilt by welding.

2. Description of Related Art

A variety of stationary and rotating seals, often referred to as the labyrinth type, are used in various parts of a gas turbine engine. During manufacture, operation, maintenance, etc., such seals, which include one or more projections or teeth connected with a support structure, can be worn or damaged.

It has become common practice to repair in a relatively cost effective manner certain types of such seal teeth or projections by first removing the damaged portion of the tooth. The same material of the tooth then is reapplied as by welding, with excess added material being removed, such as by machining, to regenerate the tooth. Methods and apparatus for conducting such repair is described in U.S. Pat. No. 4,657,171 by Bertrand G. Robins, issued Apr. 14, 1987. As is described in this and other patents referenced therein, a filler material in wire form is moved in a reciprocating manner into and out of a weld pool created by a heating source such as an electric arc to build up the teeth.

Poor weldability, including poor weld flow characteristics and crack sensitivity of the metal from which the projection or tooth is made, characterizes seal teeth repaired in this manner and often prevents repairs in a practical manner or limits the useful operating life of the components thus repaired. Accordingly, when damaged, the costly member may be replaced rather than repaired. The weldment repairs forms a heat affected zone which is that portion of the base metal which was metallurgically altered due to the welding heat. The heat affected zone also is very crack sensitive and, therefore, reduces the useful operational life of the repaired part. Therefore, it is highly desirable to improve the crack sensitivity of the heat affected zone as well as that of the part itself. The present invention incorporates laser shock peening to accomplish this and provide an improved weld repair and article therewith.

Laser shock peening or laser shock processing, as it is also referred to, is a process for producing a region of deep compressive residual stresses imparted by laser shock peening a surface area of a workpiece. Laser shock peening typically uses multiple radiation pulses from high power pulsed lasers to produce shock waves on the surface of a workpiece similar to methods disclosed in U.S. Pat. No. 3,850,698, entitled "Altering Material Properties"; U.S. Pat. No. 4,401,477, entitled "Laser Shock Processing"; and U.S. Pat. No. 5,131,957, entitled "Material Properties". Laser shock peening, as understood in the art and as used herein, means utilizing a laser beam from a laser beam source to produce a strong localized compressive force on a portion of a surface by producing an explosive force by instantaneous ablation or vaporization of a painted or coated or uncoated surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". These methods typically employ a curtain of water flowed over the workpiece or some other method to provide a confining medium to confine and redirect the process generated shock waves into the bulk of the material of a component being LSP'D to create the beneficial compressive residual stresses.

Laser shock peening is being developed for many applications in the gas turbine engine field, some of which are disclosed in the following U.S. Pat. No. 5,525,429, entitled "Laser shock peening surface enhancement for gas turbine engine high strength rotor alloy repair"; U.S. Pat. No. 5,675,892, entitled "Laser shock peening for gas turbine engine vane repair"; U.S. Pat. No. 5,591,009, entitled "Laser shock peened gas turbine engine fan blade edges"; U.S. Pat. No. 5,492,447, entitled "Laser shock peened rotor components for turbomachinery"; and U.S. Pat. No. 5,674,329, entitled "Adhesive tape covered laser shock peening" as well as others.

SUMMARY OF THE INVENTION

The present invention includes a method of repairing an annular metallic article and the article which has an axially extending annular support and a projection extending generally radially therefrom. The projection has an associated operating radial height as measured from a radially facing annular first surface of the support and an associated shape. The method includes removing at least a worn upper portion of the projection forming a stub extending away from the first surface and a bonding surface at a stub end spaced apart from the first surface and metallurgically bonding a sufficient amount of metallic material to the bonding surface so to allow restoration of the projection to the associated operating height and shape. An annular heat affected zone is formed in a portion of the stub bounded by the bonding surface during the metallurgical bonding. Next, a first portion of the metallic material is removed to restore the projection to the operating height and shape. A first outer surface portion of the tooth extending over at least a portion of the heat affected zone is laser shock peened preferably after the removing of the first portion of the metallic material. A tip of the stub formed by the removing of the first portion of the metallic material may also be laser shock peened and a non-heat affected zone portion of the stub extending at least a partial length of a distance from the heat affected zone to the first surface may also be laser shock peened.

The restored projection may include opposite forward and aft facing annular surfaces, the forward facing annular surface each having the first outer surface portion of the tooth and the aft facing annular surface having a second outer surface portion of the tooth. The laser shock peening may be performed on the first and second outer surface portions, preferably simultaneously. The laser shock peening includes firing at least one laser beam with sufficient power to vaporize ablative material on the outer surface portions and impart deep compressive residual stresses extending into the heat affected zone from the outer surface portions. The laser beams may be fired normal to the surface portions at an inclined angle with respect to a radial plane that is perpendicular to an axial centerline about which the annular support is circumscribed or at an oblique angle to the surface portions. The ablative material vaporized on the outer surface portion may be a metal of the heat affected zone of the stub, an ablative paint coating, or an ablative tape coating.

The repaired annular metallic article of the present invention includes an axially extending annular support having a radially facing annular first surface and a projection generally radially extending therefrom. The projection has an associated operating radial height as measured from the radially facing annular first surface and an associated shape. The projection includes a stub formed by removing a worn upper portion of the projection, a bonding surface at a stub end spaced apart from the annular first surface, and a tip. The tip is formed by metallurgically bonding a sufficient amount of metallic material to the bonding surface and removing a first portion of the metallic material to restore the projection to the operating height and shape. An annular heat affected zone formed in a portion of the stub bounded by the bonding surface during the metallurgical bonding includes a laser shock peened region having deep compressive residual stresses imparted by laser shock peening extending into the heat affected zone from an annular first outer surface portion of the heat affected zone. The restored projection may have opposite generally forward and aft facing annular surfaces which include the first annular surface portion and a second annular surface portion, respectively. The deep compressive residual stresses imparted by laser shock peening may also extend into the heat affected zone from the second outer surface portion of the heat affected zone and the first and second annular surface portions are preferably laser shock peened simultaneously. The tip may also be laser shock peened such that the deep compressive residual stresses imparted by laser shock peening also extend into the tip and the first and second annular surface portions extend over the tip. The stub may further include a laser shock peened non-heat affected zone portion of the stub which extends at least a partial length of a distance from the heat affected zone to the first surface and includes the deep compressive residual stresses imparted by laser shock peening extending into the non-heat affected zone portion such that the first and second annular surface portions extend over the non-heat affected zone portion.

ADVANTAGES

Advantages of the present invention are numerous and include extending the life of worn parts that may be repaired using weldments or other high temperature metallurgical buildups. The present invention may be used for dimensional restoration of seal teeth which is required due to manufacturing errors, wear, and other types of damage. This not only extends the life of repaired parts but also lowers the scrap rate of new parts which may be saved by the present invention. The present invention may be used to increase the low cycle fatigue (LCF) life and crack growth rate capability to acceptable levels of previously unacceptable rotating parts of a gas turbine engine such as seal teeth. The present invention offsets defects in the heat affected zone that may be caused by the metallurgical bonding such as welding during the buildup of the tooth tip.

BRIEF DESCRIPTION OF THE DRAWINGS

The foregoing aspects and other features of the invention are explained in the following description, taken in connection with the accompanying drawings where:

FIG. 1 is an enlarged perspective view illustrating damaged labyrinth seal teeth for the gas turbine engine seal in FIG. 1.

DETAILED DESCRIPTION OF THE INVENTION

Figure 1:
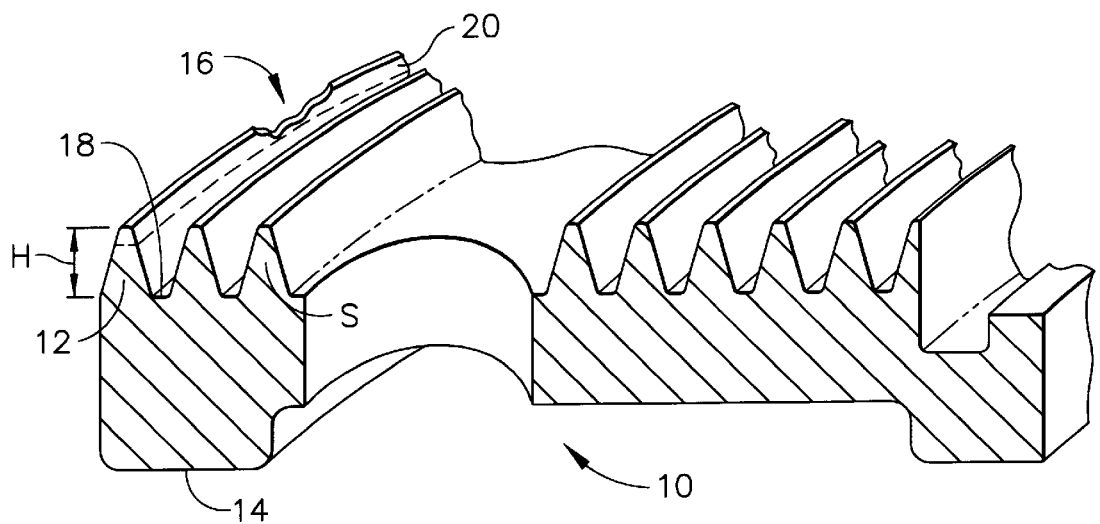
FIG. 1 is a cross sectional illustration of a portion of a gas turbine engine having a labyrinth seal with teeth which may be repaired in accordance with an exemplary embodiment of the method of the present invention.

In accordance with a preferred embodiment of the present invention, FIG. 1 illustrates a method of repairing an annular metallic article exemplified by a gas turbine engine rotatable annular labyrinth seal 10 which may be used around a shaft of the engine in a bearing compartment of the engine as well as in various other sections of the engine. The seal 10 includes one or more projections or teeth 12, as the projections are often referred to with respect to gas turbine engine labyrinth seal, extending radially away from an axially extending annular structural support 14. The annular structural support 14 is circumscribed about an axial centerline CL. During manufacture, operation, and maintenance of the seals 10, the seals can be worn or damaged as indicated by the damaged section 16 of one of the teeth 12. The teeth 12 have an associated operating radial height H as measured from a radially facing annular first surface 18 of the support 14 and an associated shape S indicated by the cross section of the tooth 12.

Figure 2:
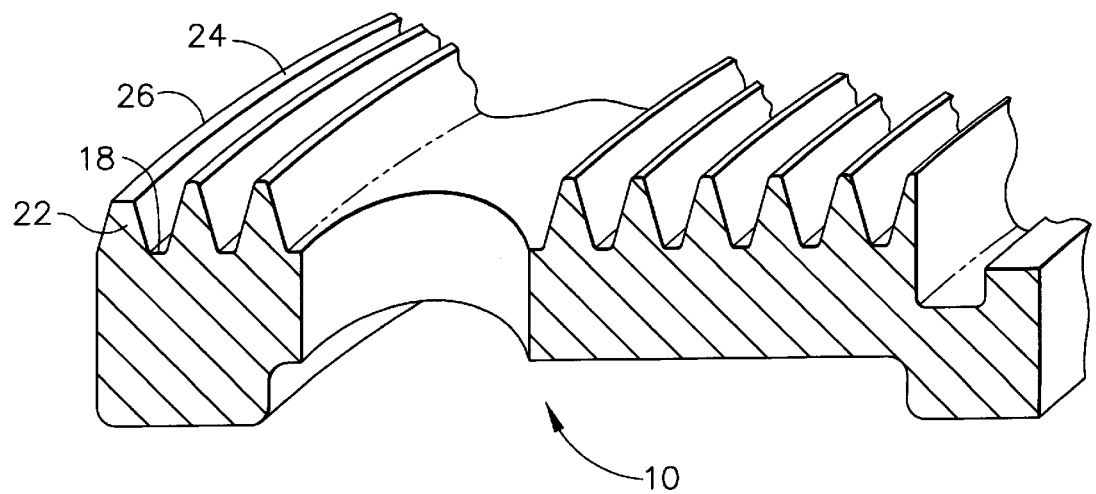
FIG. 2 illustrates forming a stub from a seal tooth in FIG. 2 in accordance with an exemplary first embodiment of the present invention.
Figure 3:
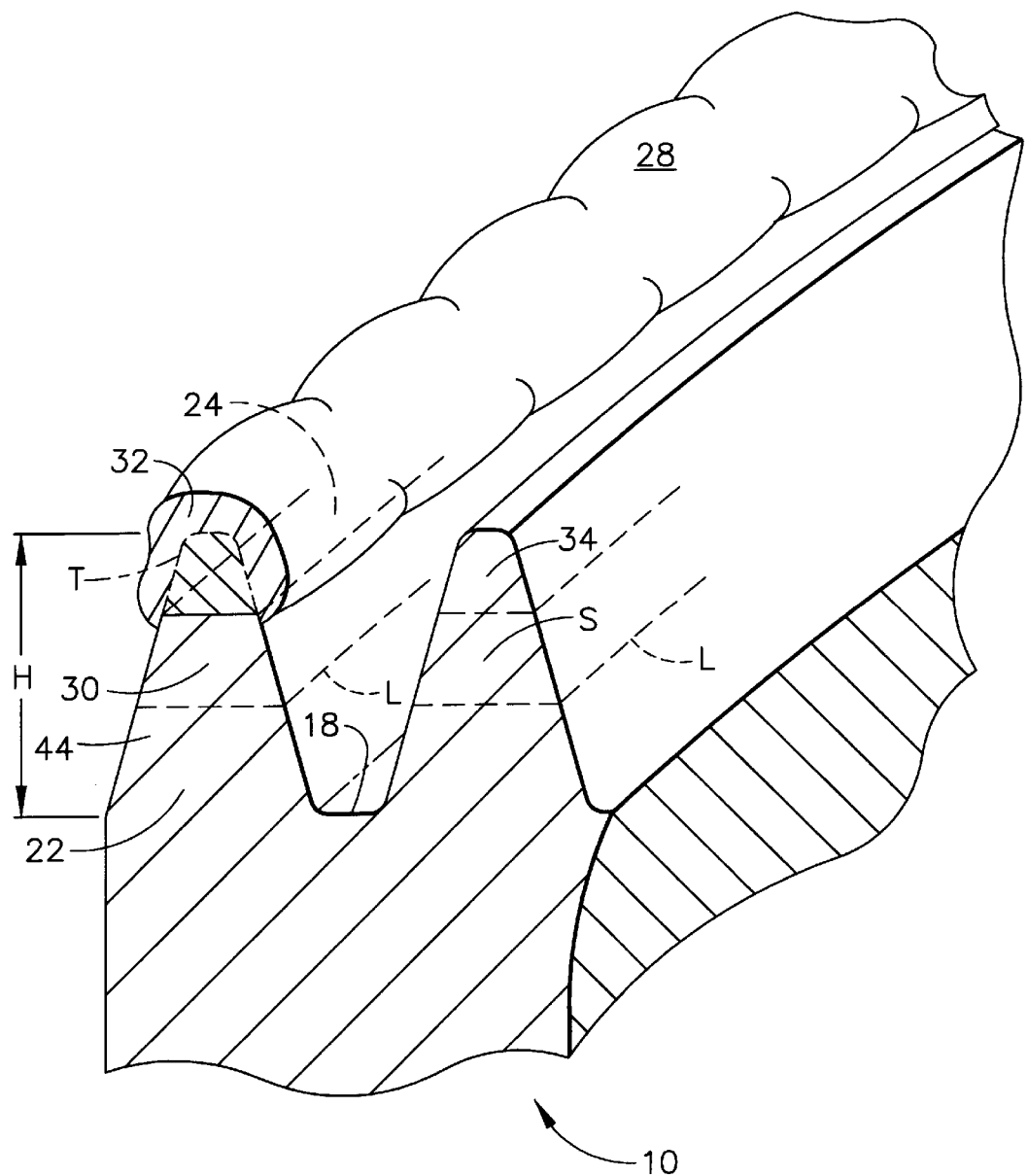
FIG. 3 illustrates metallurgically bonding a sufficient amount of metallic material to the stub in FIG. 3 so to allow restoration of the seal tooth in accordance with the exemplary first embodiment of the present invention.

The method of the present invention includes removing at least a worn upper portion 20 of the tooth 12 and, as illustrated in FIG. 2, forming a stub 22 extending away from the first surface 18 and a bonding surface 24 at a stub end 26 spaced apart from the first surface 18. Referring to FIG. 3, a sufficient amount of metallic material 28 is metallurgically bonded to the bonding surface 24 so to allow restoration of the tooth 12 to the associated operating height H and shape S. An annular heat affected zone 30 is formed in a portion of the stub 22 bounded by or adjoining the bonding surface 24 during the metallurgical bonding. The annular heat affected zone 30 is indicated in FIG. 3 as being disposed between an annular plane indicated by a first dashed line L and the bonding surface 24. Next, a first portion 32 of the metallic material 28 is removed to restore the tooth 12 to the operating height H and shape S and form a tip 34 of restored tooth 12. The first portion 32 is indicated outward of a tip dashed line T. The metallic material 28 is metallurgically bonded typically with a welding process or some other high temperature bonding process which to produce what is referred to as a weldment or other high temperature metallurgical buildup from which the tip 34 is formed.

Figure 4:
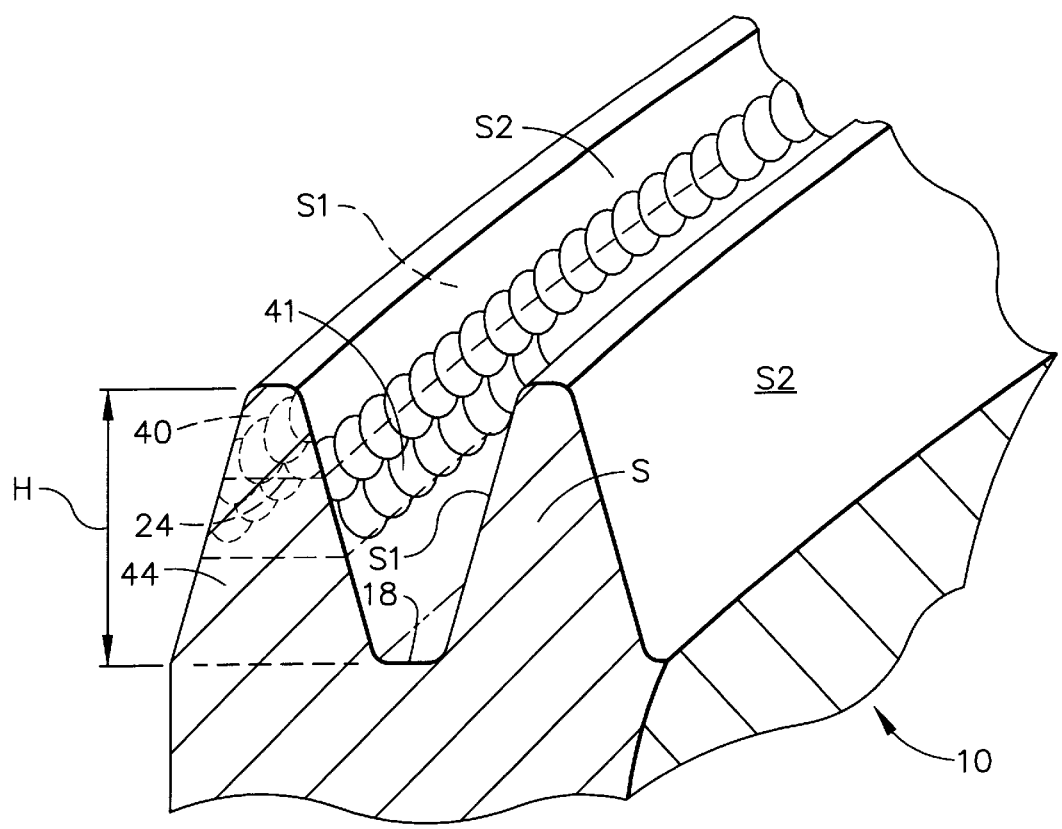
FIG. 4 illustrates removing some of the metallic material to dimensionally restore seal tooth and laser shock peening of a heat affected zone in FIG. 4.

Referring to FIG. 4, an annular first outer surface portion 40 of the tooth extending over at least a portion of the heat affected zone 30 is laser shock peened, indicated by laser shock peened spots 45, preferably after the removing of the first portion 32 of the metallic material 28. The tooth 12 has opposite forward and aft facing annular surfaces S1 and S2, including the first outer surface portion 40 and an annular second outer surface portion 41 respectively, and the laser shock peening may be performed on both of the first and second outer surface portions 40 and 41 respectively. The first and second outer surface portions 40 and 41, respectively, are preferably laser shock peened simultaneously.

Figure 5:
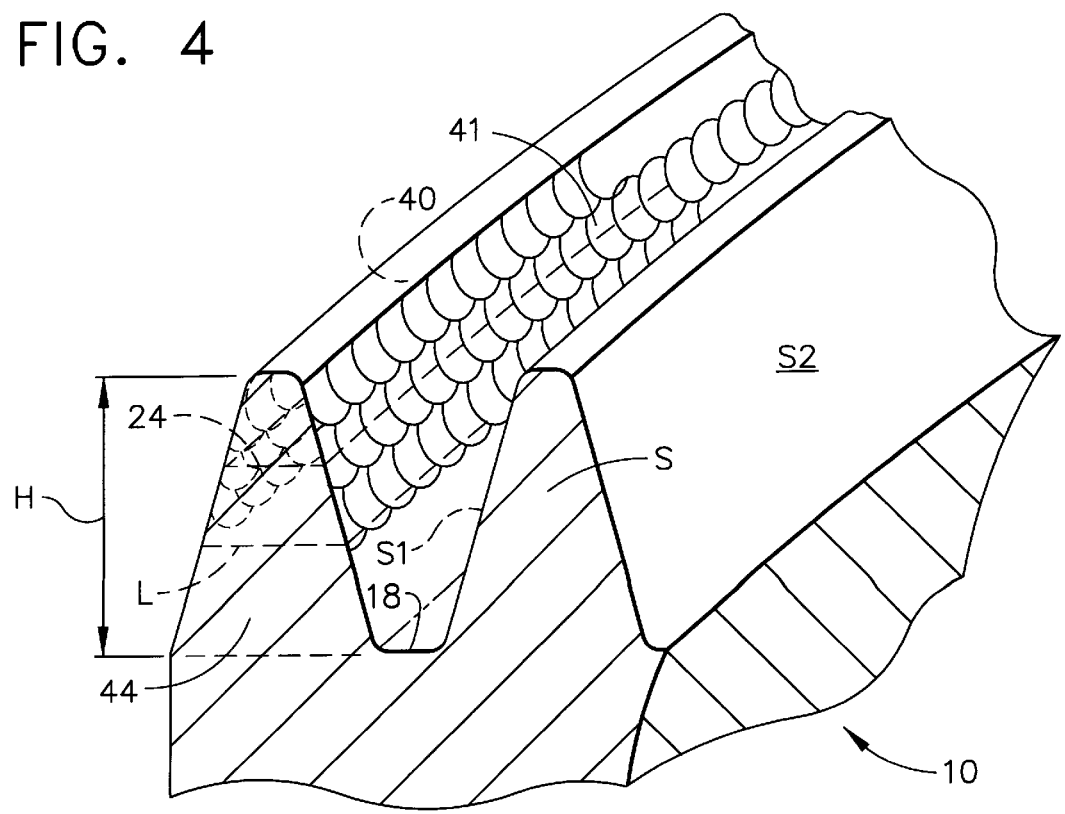
FIG. 5 illustrates a first alternative laser shock peening method of the dimensionally restored seal tooth in FIG. 4.
Figure 6:
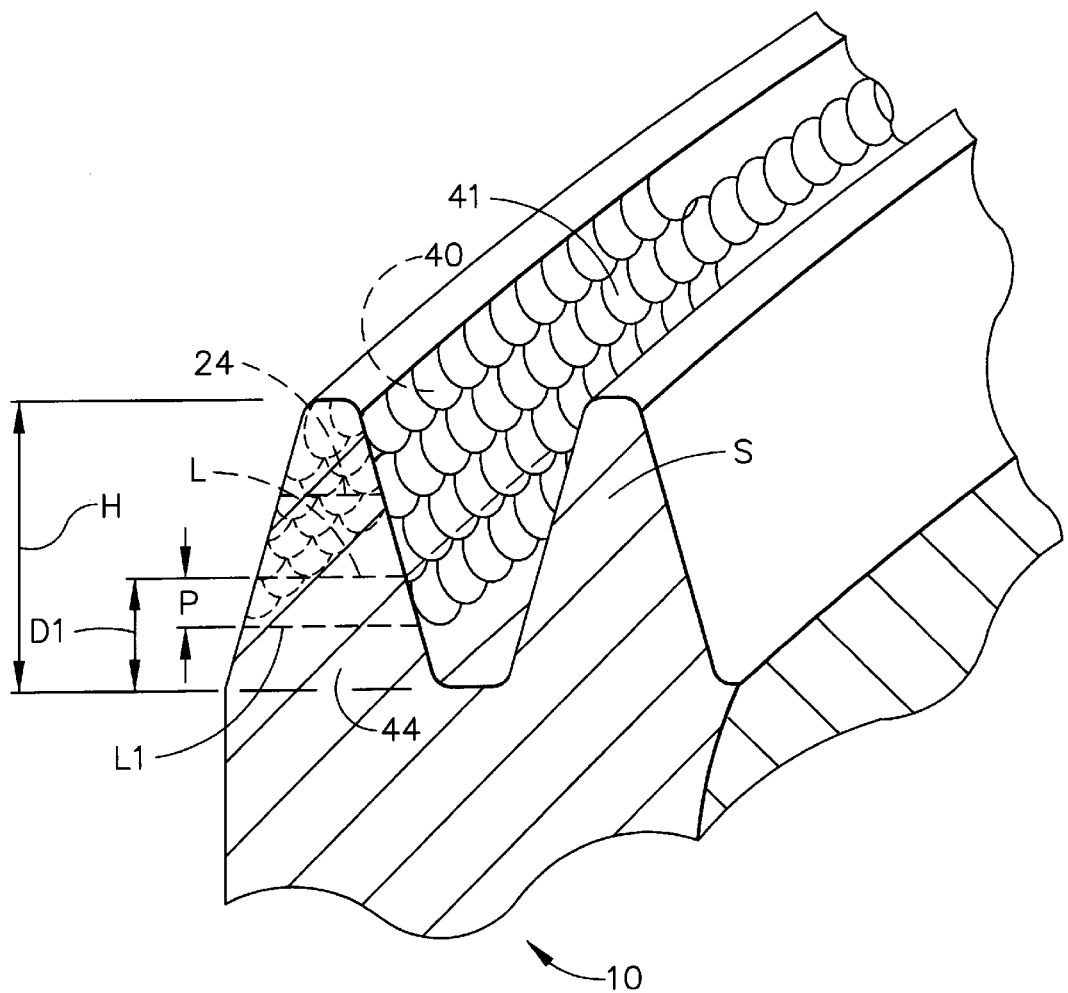
FIG. 6 illustrates a second alternative laser shock peening method of the dimensionally restored seal tooth in FIG. 4.

As illustrated in FIG. 5, the tip 34 may also be laser shock peened in addition to the heat affected zone 30 by extending the first and second outer surface portions 40 and 41, respectively to cover tip. FIG. 6 illustrates another embodiment of the present invention which further extends the first and second outer surface portions 40 and 41, respectively, to cover a non-heat affected zone portion 44 of the stub 22 which is extends at least a partial length P of a distance D1 between the heat affected zone 30 and the first surface 18. The partial length P defines a volumetric region extending between the first dashed line L and a second dashed line L1 where the second dashed line is between the first dashed line and the first surface 18.

Figure 7:
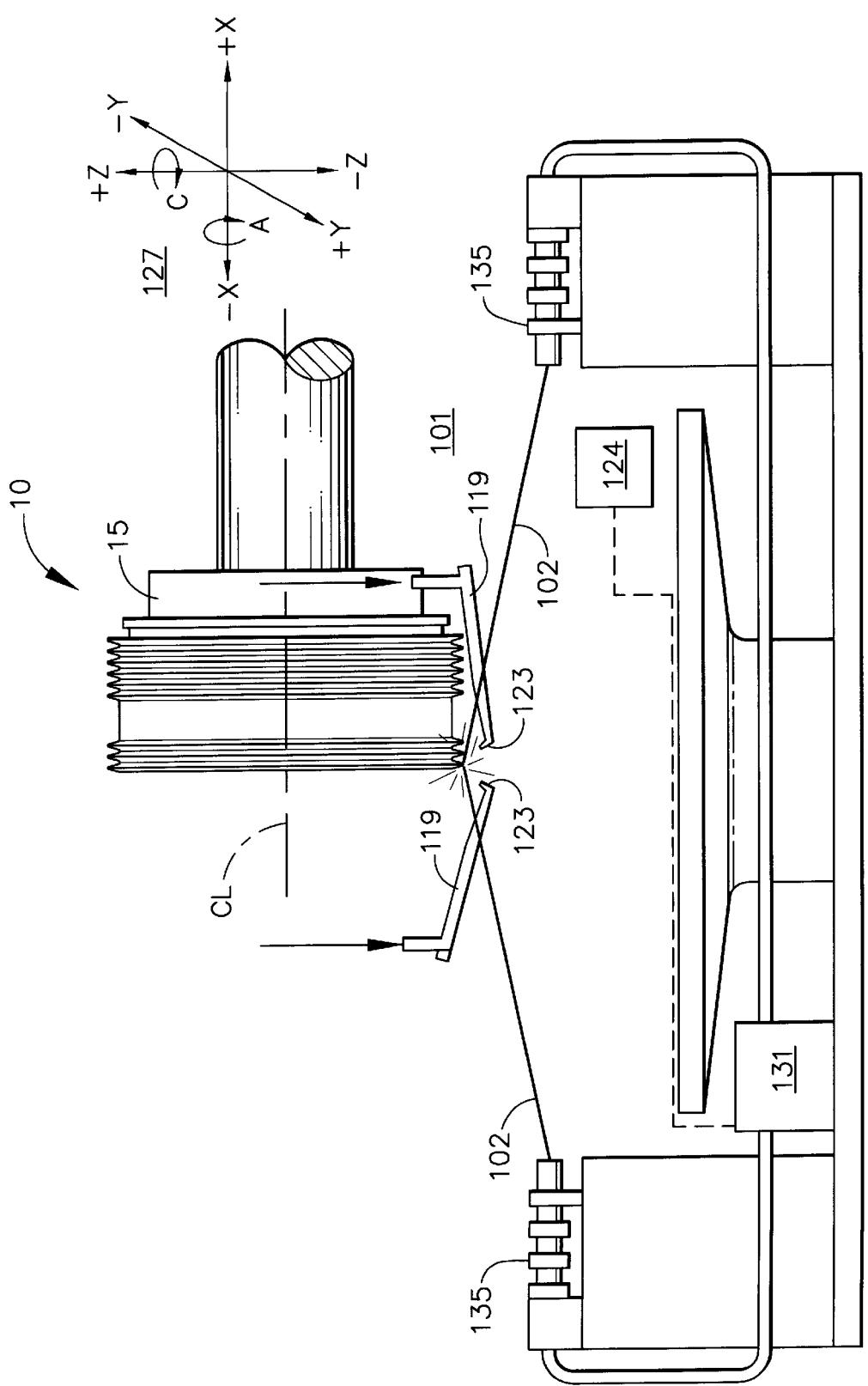
FIG. 7 is a schematic perspective illustration of the seal of FIG. 2 mounted in a laser shock peening system in accordance with the exemplary embodiment of the present invention.
Figure 8:
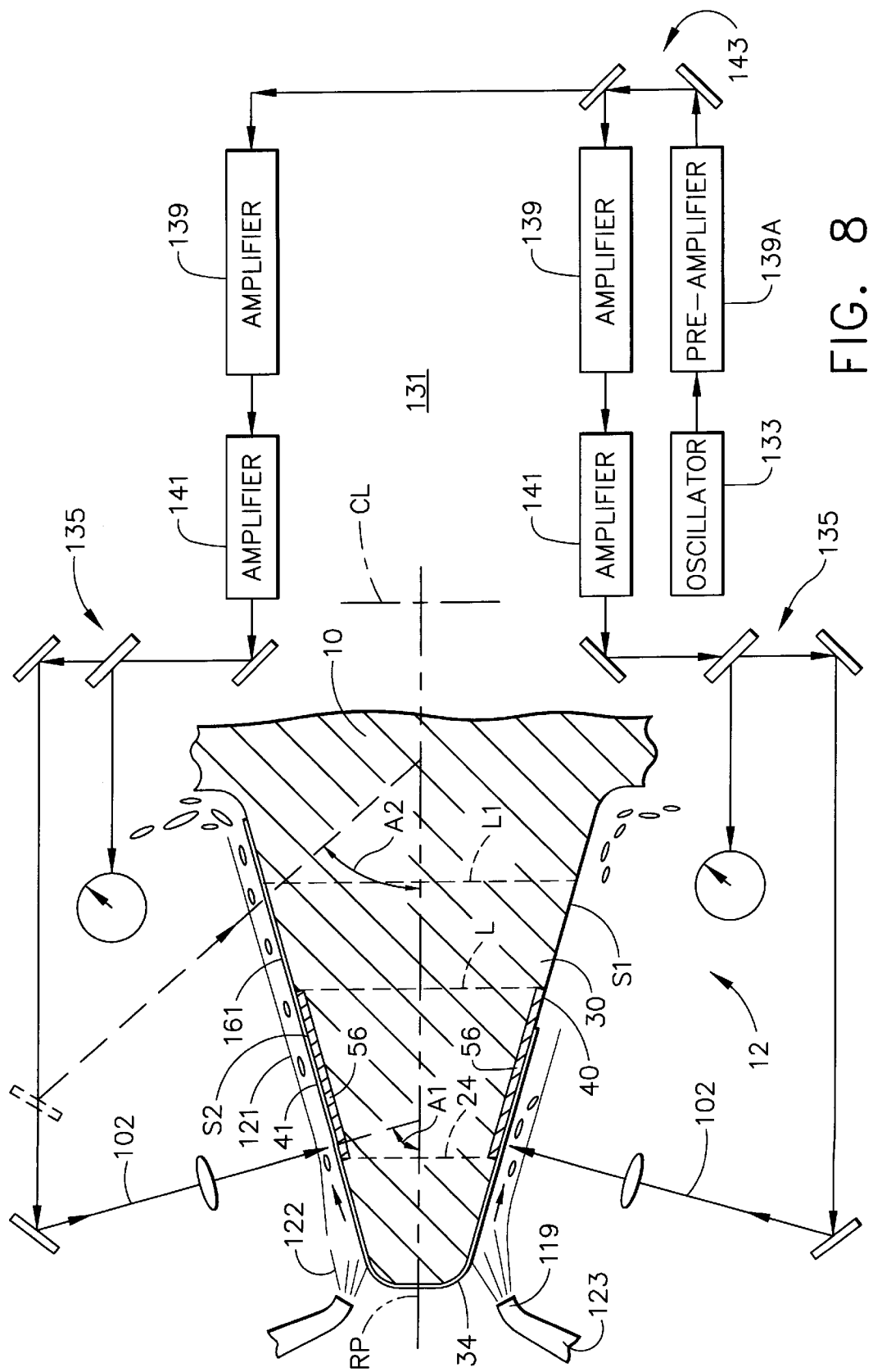
FIG. 8 is a schematic illustration of the laser shock peening of FIG. 8.

Illustrated in FIGS. 7 and 8 is a laser shock peening system 101 for laser shock peening the teeth 12. The annular labyrinth seal 10 is mounted on a fixture 15 which is attached to a five-axis computer numerically controlled (CNC) manipulator 127, such as one commercially available from the Huffman Corporation, having an office at 1050 Huffman Way, Clover, SC 29710. The five axes of motion that are illustrated in the exemplary embodiment are conventional translational axes X, Y, and Z, and conventional rotational axes A and C that are well known in CNC machining. The manipulator 127 is preferably used to move and position the seal 10 and to effect laser shock peening "on the fly" in accordance with a laser shock peening method and of the present invention (see U.S. Pat. No. 5,756,965). The manipulator 127 is used to continuously move and position the blade to provide laser shock peening "on the fly" in accordance with one embodiment of the present invention.

The laser shock peening is illustrated in FIGS. 7 and 8 as including firing at least one and preferably two laser beams 102 with sufficient power to vaporize ablative material of an ablative coating 161 such as paint or preferably adhesive tape as disclosed in U.S. Pat. Nos. 5,674,329 and 5,674,328. The ablative coating 161 is placed on the outer surface portions of the heat affected zone and the laser beams 102 are fired through a clear containment medium which may be a clear fluid curtain such as a curtain of flowing water 121 produced by a flow of water 122. The laser beams 102 may be directly fired on first and second outer surface portions 40 and 41, respectively which are uncoated and the ablative material is the metallic material of the tooth 12 through the curtain of flowing water 121 in which case a small portion of the surface material will be ablated away. The laser shock peening imparts deep compressive residual stresses into a laser shock peened region 56 extending into the heat affected zone from the forward and aft facing annular surfaces S1 and S2, respectively. The laser beams 102 may be fired normal to the forward and aft facing annular surfaces S1 and S2 respectively at a first oblique angle A1 inclined with respect to a radial plane RP. Alternatively, the laser beams 102 may be fired oblique to the forward and aft facing annular surfaces S1 and S2, respectively, as shown in dashed line at a second more inclined oblique angle A2 that is inclined with respect to the radial plane RP at a shallower angle than the first oblique angle A1. The embodiment which fires the laser beams 102 oblique to the forward and aft facing annular surfaces S1 and S2, respectively, forms the laser shock peened spots 45 in an oval shape since the circular cross-section laser beams intersect the annular surfaces at an oblique angle.

Preferably, the seal 10 is continuously moved or rotated about the axial centerline CL while the stationary high power laser beams 102 are continuously repetitively fired through the curtain of flowing water 121 on the forward and aft facing annular surfaces S1 and S2, respectively, and forming the spaced apart laser shock peened spots 45. The curtain of water 121 is illustrated as being supplied by a conventional water nozzle 123 at the end of a conventional water supply tube 119. The laser shock peening system 101 has a conventional generator 131 with an oscillator 133 and a pre-amplifier 139A and a beam splitter 143 which feeds the pre-amplified laser beam into two beam optical transmission circuits each having a first and second amplifier 139 and 141, respectively, and optics 135 which include optical elements that transmit and focus the laser beam 102 on the forward and aft facing annular surfaces S1 and S2, respectively. A controller 124 may be used to modulate and control the laser shock peening system 101 to fire the laser beams 102 on the coated surfaces 155 in a controlled manner. Ablated material is washed out by the curtain of flowing water 121.

The paint, tape, or other ablative coating 161 material is ablated by the laser beam 102 generating plasma which results in shock waves on the outer surface portion 40 of the heat affected zone 30. Other ablative materials may be used to coat the surface as suitable alternatives to paint. These coating materials include metallic foil or adhesive plastic tape as disclosed in U.S. Pat. Nos. 5,674,329 and 5,674,328. These shock waves are re-directed towards the outer surface portion 40 the curtain of flowing water 121 to generate travelling shock waves (pressure waves) in the metallic material of the tooth below the outer surface portion 40. The amplitude and quantity of these shockwaves determine the depth and intensity of compressive stresses. The ablative coating is used to protect the target surface and also to generate plasma. The laser beam shock induced deep compressive residual stresses are generally about 50–150 KPSI (Kilo Pounds per Square Inch) extending from the outer surface portion 40 into the tooth 12 to a depth of about 20–50 mils.

Suitable materials for the ablative coating 161 include plastic such as vinyl plastic film and foil. One suitable source for the tape is Scotch Brand No. 471 Plastic Film Tape which can be had with a black pigmented vinyl plastic backing, about 4 mils thick, and has a rubber adhesive layer, about 1 mil thick. The ablative coating may also be in the form of a tape without an adhesive layer which may be used with a suitable adhesive material applied directly to the forward and aft facing annular surfaces S1 and S2, respectively. The tape should be rubbed or otherwise pressed against the metallic material of the tooth 12 to remove bubbles that may remain between the tape and the forward and aft facing annular surfaces respectively.

The preferred embodiment of the method of the present invention includes continuously rotating the annular seal 10 while continuously repetitively firing the laser beams 102 on the forward and aft facing annular surfaces S1 and S2, respectively, to form overlapping laser shock peened spots 45. Several passes may be made with offset spots 45 in each pass.

Figure 9:
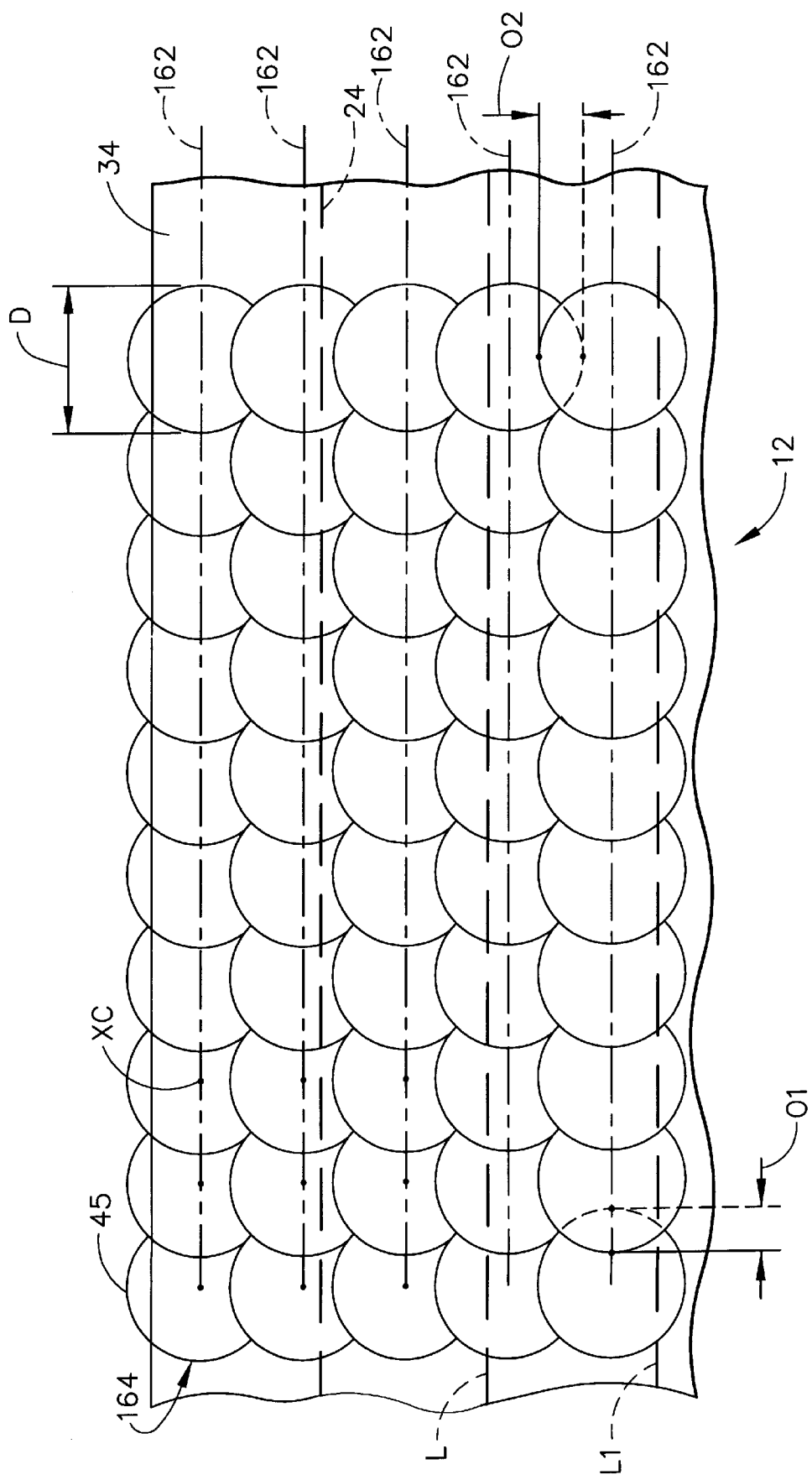
FIG. 9 is a schematic illustration of a pattern of laser shocked peened spots on the tooth the seal in FIGS. 1–7.

An exemplary pattern of stacked rows of overlapping laser shocked peened spots 45 are illustrated in FIG. 9. All the laser shocked peened spots 45 with their corresponding centers XC lie along a row centerline 162. The pattern of sequences entirely covers the laser shock peened portions the forward and aft facing annular surfaces S1 and S2, respectively. The laser shocked peened spots 45 have a diameter D in a row 164 of overlapping laser shock peened spots. The pattern may be of multiple overlapping rows 164 of overlapping shock peened spots 45. A first exemplary overlap, illustrated as about 30%, is between adjacent laser shock peened spots 45 in a given row. The overlap is typically defined by a first offset O1 between centers XC of the adjacent laser shock peened spots 45 and though illustrated as 30% it can vary from about 30%–50% or more of the diameter D. A second overlap is between adjacent laser shock peened spots 45 in adjacent rows and is generally defined by a second offset O2 between adjacent row centerlines 162 and though illustrated as 30% it can vary from about 30%–50% of the diameter D depending on applications and the strength or fluency of the laser beam. The pattern is referred to as stacked because the centers XC of adjacent spots 45 in adjacent rows are all linearly aligned. Other patterns are disclosed in the references, see U.S. Pat. Nos.: 5,591,009, 5,674,329 and 5,674,328.

While the preferred embodiment of the present invention has been described fully in order to explain its principles, it is understood that various modifications or alterations may be made to the preferred embodiment without departing from the scope of the invention as set forth in the appended claims.

We claim:

1. A method of repairing an annular metallic article having an axially extending annular support and a projection generally radially extending therefrom, the projection having an associated operating radial height as measured from a radially facing annular first surface of the support and an associated shape, the method comprising:

removing at least an upper portion of the projection forming a stub extending away from the first surface wherein the stub has a bonding surface at a stub end spaced apart from the first surface, metallurgically bonding a sufficient amount of metallic material to the bonding surface so to allow restoration of the projection to the associated operating height and shape and wherein an annular heat affected zone is formed in the stub adjoining the bonding surface during said metallurgical bonding, forming a restored projection by removing a first portion of the metallic material to restore the projection to the operating height and shape, and laser shock peening an annular first outer surface portion of the stub with the metallic material bonded to the bonding surface after the metallic material has been bonded to the bonding surface wherein the first outer surface portion extends in a generally radial direction over at least a portion of the heat affected zone.

2. A method as claimed in claim 1 wherein the heat affected zone is laser shock peened after the removing of the first portion of the metallic material.

3. A method as claimed in claim 2 further comprising laser shock peening a tip of the metallic material on the stub wherein the tip is formed by the removing of the first portion of the metallic material.

4. A method as claimed in claim 3 further comprising laser shock peening an annular non-heat affected zone portion of the stub extending generally radially at least a partial length of a distance from the heat affected zone to the first surface.

5. A method as claimed in claim 2 wherein:

the restored projection has opposite forward and aft facing annular surfaces, the forward facing annular surface includes the annular first outer surface portion of the restored projection, the aft facing annular surface includes the annular second outer surface portion of the restored projection, and said the laser shock peening is performed on both of the outer surface portions.

6. A method as claimed in claim 5 wherein the annular first and second outer surface portions are laser shock peened simultaneously.

7. A method as claimed in claim 2 further comprises firing at least one laser beam at different inclined angles with respect to a radial plane that is perpendicular to an axial centerline about which said annular support is circumscribed.

8. A method as claimed in claim 7 further comprising laser shock peening an annularly extending tip of the metallic material on the stub wherein the tip is formed by the removing of the first portion of the metallic material.

9. A method as claimed in claim 8 further comprising laser shock peening an annular non-heat affected zone portion of the stub extending generally radially at least a partial length of a distance from the heat affected zone to the first surface.

10. A method as claimed in claim 2 wherein:

the restored projection has opposite forward and aft facing annular surfaces, the forward facing annular surface includes the annular first outer surface portion of the restored projection, the aft facing annular surface includes the annular second outer surface portion of the restored projection, and said the laser shock peening is performed on both of the outer surface portions simultaneously by firing first and second laser beams respectively with sufficient power to vaporize ablative material on the outer surface portions while flowing curtains of water over the outer surface portions and impart deep compressive residual stresses extending into the restored projection from the outer surface portions.

11. A method as claimed in claim 10 wherein each of the first and second laser beams are fired at different inclined angles with respect to a radial plane that is perpendicular to an axial centerline about which said annular support is circumscribed.

12. A method as claimed in claim 10 wherein the ablative material is chosen from a group of materials, said group consisting of a metal of the heat affected zone of the stub, an ablative paint coating, and an ablative tape coating.

13. An annular metallic article comprising:

an axially extending annular support having a radially facing annular first surface and a projection extending generally radially therefrom, said projection having an associated operating radial height as measured from said radially facing annular first surface and an associated shape, said projection comprising a stub, a bonding surface at a stub end spaced apart from said annular first surface, and a tip comprising an amount of metallic material metallurgically bonded to said bonding surface, an annular heat affected zone formed in said stub adjoining said bonding surface during the metallurgical bonding, and a laser shock peened region having deep compressive residual stresses imparted by laser shock peening extending into said heat affected zone from an annular first outer surface portion of said heat affected zone.

14. An article as claimed in claim 13 wherein said projection has opposite generally forward and aft facing annular surfaces which include said first outer surface portion and an annular second outer surface portion respectively and said deep compressive residual stresses imparted by laser shock peening extend into said heat affected zone from said second outer surface portion of said heat affected zone.

15. An article as claimed in claim 14 wherein said first and second annular surface portions were laser shock peened simultaneously.

16. An article as claimed in claim 15 wherein said tip is laser shock peened and said deep compressive residual stresses imparted by laser shock peening extend into said tip.

17. An article as claimed in claim 16 further comprising an annular laser shock peened non-heat affected zone portion of the stub extending at least a partial length of a distance from the heat affected zone to the first surface, said deep compressive residual stresses imparted by laser shock peening extending into said non-heat affected zone portion.

\* \* \* \* \*